June 30, 1931.   T. M. HUNTER   1,811,886
WELDING TRANSFORMER
Filed Feb. 16, 1929   2 Sheets-Sheet 1

INVENTOR
THOMAS M. HUNTER
BY
A. D. T. Libby
ATTORNEY

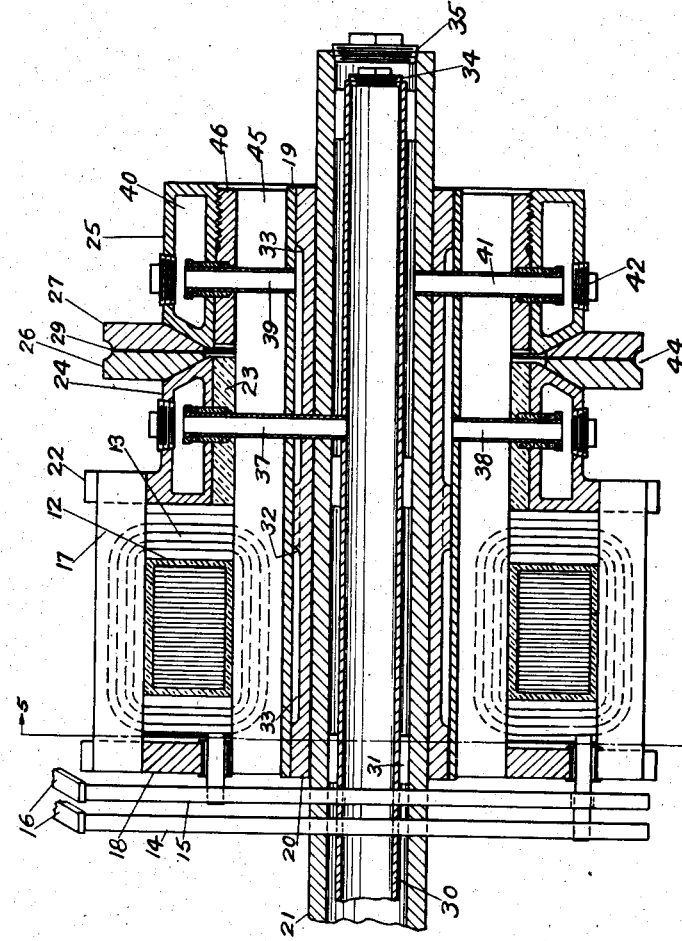
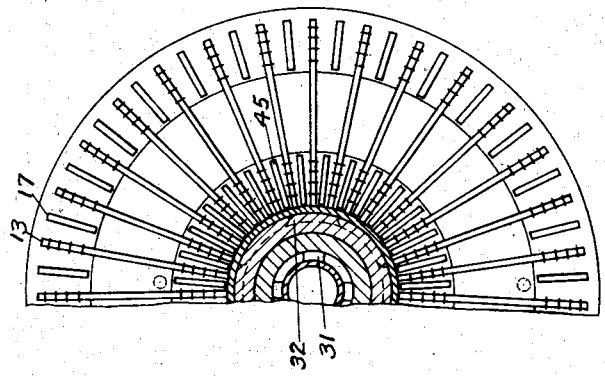

Patented June 30, 1931

1,811,886

UNITED STATES PATENT OFFICE

THOMAS M. HUNTER, OF EAST ORANGE, NEW JERSEY

WELDING TRANSFORMER

Application filed February 16, 1929. Serial No. 340,513.

This invention relates to a special type of transformer which is especially useful in heating and welding tubes, but while the drawings illustrate the application of the invention to this purpose, I wish it to be understood that my invention contemplates the use of this design for any other purpose for which it may be found applicable. In the welding of sheet material or tubing, a heavy current at a low voltage is required, as the heating effect is proportional to the square of the current which must heat the metal to a welding temperature.

In Patent 1,478,262 filed jointly by myself and Harlan E. Snodgrass, there is shown and described a rotary transformer for heating and welding tubing. My present invention is directed to a number of improvements over the construction set forth in said patent. It is therefore the principal object of my invention to provide a transformer for the purpose herein described which will be much more efficient, and one that will do more and better work than the transformers heretofore proposed for the class of service to which my invention is applicable.

While attaining the principal object of my invention, it will be apparent from reading the specification taken in connection with the annexed drawings, that other and ancillary objects are obtained by the construction now to be described.

In the drawings, which are more or less diagrammatical in form;

Figure 4 is a very similar view to Figure 2, but showing a modified form of construction.

Figure 5 is a view taken similarly to Figure 3, but taken on the line 5—5 of Figure 4.

Figure 1:
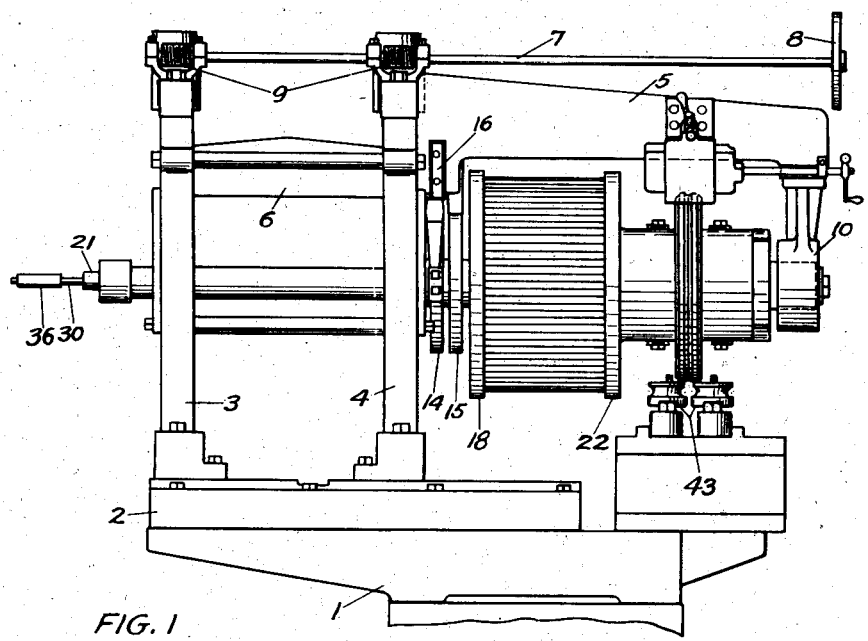
Figure 1 is a partial side view of part of a tube welding machine showing the completed transformer in operative position.

Referring now to the details, wherein like numbers refer to corresponding parts in the various views, 1 illustrates the top part of a base or pedestal of the tube welding machine. Attached to the base 1 is a framework 2 having uprights 3 and 4 fastened thereto. Carried by the uprights 3 and 4 is an arm 5 having an end 6 carried between portions of the uprights 3 and 4. The uprights 3 and 4 carry screw-threads which cooperate with the portion 6, so that on turning the shaft 7 by means of the handle 8, these screw-threads are operated through the medium of the worm gears 9, thereby raising and lowering the arm 5.

The outer end of the arm 5 carries a bearing support bracket 10 which supports one end of the transformer shaft, the other end being supported by suitable bearings in the uprights 3 and 4. This adjustment of the arm 5 carrying the transformer is for the purpose of accommodating the heating or welding electrodes of the transformer to tubes of various sizes, as will be later referred to. No claim is being made in this application to the mechanical details just described and it is obvious that these may be varied considerably.

My present invention contemplates the use of a core for the transformer similar to that shown in the Hunter et al. patent hereinbefore referred to, and likewise a primary winding of a somewhat similar nature. By reference to Figure 2, it will be seen that the core 11 is made up of laminated material having suitable magnetic characteristics. Preferably the core is surrounded by an insulator 12 and the primary winding 13 has terminals brought out to a pair of slip rings 14 and 15 to which a current supply may be connected by means of brushes 16.

Figures 2, 3:
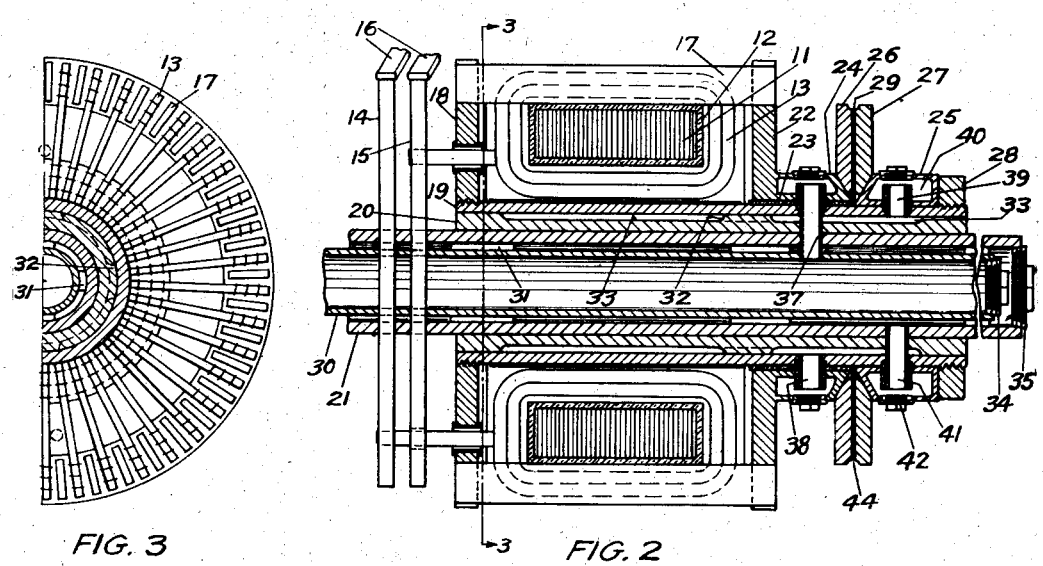
Figure 2 is a longitudinal sectional view through one form of transformer.
Figure 3 is a sectional view of one-half of the transformer taken on the line 3—3 of Figure 2.

I have found that the efficiency of the transformer may be materially increased by sandwiching or intermingling the conductors forming the secondary winding alternately with the turns or coils of the primary. This arrangement of conductors produces the maximum coupling between the primary and secondary, thereby reducing the reactance losses to a minimum and the regulation of the transformer is greatly improved. This is highly important in a machine of this character where the secondary voltage is so extremely low; i. e., of the order of two to three volts. My improved transformer herein described is one in which the load or welding voltage is not materially different from the open circuit voltage. In Figures 2 and 3 the secondary is composed of a plurality of bars of good conducting material preferably of copper which are also preferably rectangular in shape and are disposed between alternate turns or coils of the primary.

On opposite sides of the core 11, there is positioned a disc of metal preferably of good conducting material and the secondary bars are attached to these discs in any satisfactory manner as by dropping the bars 17 into slots provided in the discs and brazing or welding the bars to the discs. The disc 18 adjacent the slip rings 14 and 15 is fastened in any satisfactory manner as by screw-threads and brazing or welding to the end of a heavy copper tube 19. The tube 19 is carried on a metallic sleeve 20 preferably of steel, fastened thereto in any satisfactory manner. Likewise, the sleeve 20 is fastened to a hollow operating shaft 21 which is supplied with bearings (not shown) for rotatably supporting the transformer.

The disc 22 is securely mounted on the other end of the sleeve 20 but insulated therefrom by suitable insulation 23. The disc 22 has preferably formed integral therewith, a hollow annular ring or abutment 24. Adjacent the ring or abutment 24, is another hollow ring 25 which is mounted on the end of the tube 19 and in good electrical contact therewith. Preferably, the rings 24 and 25 are provided with sloping surfaces to engage respectively the electrodes 26 and 27 which are clamped in operative position by means of a clamp nut 28 screw-threaded on the outer end of the tube 19.

The electrodes 26 and 27 are separated by insulation 29 of any suitable kind such as mica.

Carried within the shaft 21 is a metallic tube 30 which is spaced from the inner walls of the shaft by the splines 31. Likewise, the sleeve 20 is spaced by the splines 32 away from the tube 19, so as to provide a cooling chamber 33 between the sleeve 20 and the tube 19. The end of the tube 30 is closed by a plug 34, while the end of the shaft is closed by a plug 35.

Assuming that a cooling fluid such as water is brought in through the tube 30 by means of a suitable rotary intake valve 36, the fluid will pass by means of a connector or pipe 37 to the hollow portion of the ring 24 and then by means of the pipe 38 supported in the tube 19, to the chamber 33. From the chamber 33 the fluid is carried by pipe 39 to the hollow part 40 of the ring 25, and from the hollow portion 40 by means of the pipe 41, the fluid is carried to the space between the drive shaft 21 and the tube 30 from where it is delivered to the exterior from the shaft end adjacent the valve 36 or out the other end by removing the plug 35.

It will be noted that these various connecting pipes 37, 38, 39, and 41, may be inserted in position through the holes plugged by the plugs 42. As shown in the drawings, the rubber tubing used as bushings for the pipes 37, 38, 39, and 41, acts as packing to assist in holding the tubes in position, and in the case of the tube 37, serves to insulate it from the disc 22 and its cooperating ring or abutment 24.

By this construction of a transformer, I have materially increased the efficiency and output both by the method of arranging the secondary conductors with respect to the primary and in the matter of carrying away the heat produced by the increased current that can be obtained.

It will be understood that in the welding operation, the tube passes between the squeeze rolls 43 and engages the groove 44 formed by the two electrodes 26 and 27. Thus a certain amount of pressure is put to the tube material simultaneously with the heating of the tube by the two-part electrode wheel.

Since the secondary bars 17 are spaced between the turns or coils of the primary, air spaces are left between these conductors and better cooling is obtained than in the closed type of transformer referred to in the said Hunter et. al. patent.

In the form shown in Figure 4, I have used bars 45 similar to bars 17, except that they are longer and convey the current back to the sleeve 46 and the electrode 27 by means of clamping ring 25. When this construction is used, the bars 45 rest on the copper tube 19 which however, in this case may be of a standard thickness, whereas in the construction shown in Figures 2 and 3, the copper tube 19 is a special thick wall type. It will be noted, however, in either form that the secondary turns are reduced to the shortest minimum possible, as the secondary conductors are placed so as to rest on the insulator 12 which surrounds the core, and this construction together with the bar form of copper utilized, gives a secondary of extremely low resistance and consequently a high current output.

While attaining the highly desirable characteristics heretofore set forth, I have also obtained a mechanical construction which is much better and cheaper in the cost of construction than in any type of transformer of this kind of which I am aware.

It will be apparent that certain changes in the details of my invention may be made without departing from the spirit of the same or the scope of the appended claims.

Having thus described my invention, what I claim is:

1. In a heating and seam welding rotary transformer having a core, a primary winding surrounding said core, a heavy current secondary consisting at least in part, of bars of good conducting material, said bars being sandwiched in between the turns or coils of the primary; means for rotating the entire transformer, a two-part wheel mounted adjacent the core and rotatable with the transformer, the terminals of the secondary being connected to adjacent parts of said wheel, said parts of the wheel being separated by an insulator, means for clamping said parts against the insulator, and means for passing a cooling fluid through at least said clamping means.

2. In a heating and seam welding transformer, a core, a primary winding surrounding the core, a heavy current secondary wound directly on the core so at least the outer conductors of the secondary are in intermingled relationship with the primary turns or coils, means for rotating the core and both the primary and secondary windings, means for conveying current to the primary, and a two-part wheel having the parts separated by an insulator and mounted for rotation with the core, said secondary having its terminals connected to the opposite parts of said wheel and means for cooling the parts of the wheel.

3. In a heating and seam welding transformer, a core, a primary winding surrounding said core, a heavy current secondary consisting at least in part, of bars of good conducting material, said bars being alternately intermingled with the coils of the primary, metallic discs located one each on opposite sides of the core and securely connected to the corresponding bar ends, one of said discs having an annular ring extending therefrom, a second annular ring having metallic connection with the other of said discs, and a two-part welding or heating member clamped between said rings, thus forming the working terminals of the secondary.

4. In a heating and seam welding transformer, a core, a primary winding surrounding said core, a heavy current secondary consisting at least in part, of bars of good conducting material, said bars being alternately intermingled with the coils of the primary, metallic discs located one each on opposite sides of the core and securely connected to the corresponding bar ends, one of said discs having an annular ring extending therefrom, a second annular ring having metallic connection with the other of said discs, a two-part welding or heating member clamped between said rings, thus forming the working terminals of the secondary, both of said rings being hollow, and means for passing a cooling fluid through the hollow portions of said rings.

5. In a heating and seam welding transformer, a core, a primary winding surrounding the core, a heavy current secondary wound directly on the core so at least the outer conductors of the secondary are in intermingled relationship with the primary turns or coils, means for rotating the core and both the primary and secondary windings, means for conveying current to the primary, a metallic disc located on each side of the core and securely anchored to the ends of the secondary winding, one of said discs having an abutment portion, a ring having metallic connection with the other of said discs, and a two-part contact member rotated with the core clamped by said ring against said abutment whereby the two parts of said contact member comprise the electrode terminals of the secondary.

6. In a heating and seam welding transformer, a core, a primary winding surrounding the core, a heavy current secondary wound directly on the core so at least the outer conductors of the secondary are in intermingled relationship with the primary turns or coils, a hollow shaft for rotating the core and both the primary and secondary windings, means for conveying current to the primary, a metallic disc located on each side of the core and securely anchored to the ends of the secondary winding, one of said discs having an abutment portion, a ring having metallic connection with the other of said discs, and a two-part contact member rotated with the core clamped by said ring against said abutment whereby the two parts of said contact member comprise the electrode terminals of the secondary, said abutment and ring being hollow, a tube for carrying cooling fluid positioned within the shaft, means for passing the cooling fluid from said tube to one of said hollow portions, means for passing the fluid to the other hollow portion, and means for passing the fluid out via the hollow shaft.

7. In a heating and seam welding transformer, a core, a primary winding surrounding the core, a heavy current secondary wound directly on the core so at least the outer conductors of the secondary are in intermingled relationship with the primary turns or coils, means for rotating the core and both the primary and secondary windings, means for conveying current to the primary, a metallic disc located on each side of the core and securely anchored to the ends of the secondary winding, an annular hollow abutment electrically connected to one of said discs, a hollow ring having metallic connection with the other of said discs, a pair of electrode members insulated from each other but clamped in operative position between said abutment and the ring, and means for passing a cooling fluid through the hollow portions of the abutment and the ring.

8. A rotary transformer including an annular core, a primary and a secondary winding formed of looped conductors placed in intermingled relationship one with the other around the core, a two-part electrode wheel having an insulator therebetween connected to and forming the terminals of the secondary, means for rotating the transformer and means for conveying current through said primary.

9. In a tube welding transformer, an annular core, a shaft for rotating the core, a primary winding disposed around the core, means for conveying current to said primary, a secondary winding; formed by two discs, one on each side of the core, and conductors alternately intermingled with the coils of the primary and at least the outer conductors being connected to both of said discs and a two-part electrode wheel having the parts separated by an insulator one part connected to one of said discs and the other part to the other of said discs.

10. In a tube welding transformer, an annular core, means for rotating the core, a primary winding surrounding and rotatable with the core, means for conveying current to said primary, a secondary winding; formed by two discs, one on each side of the core, and conductors alternately intermingled with the coils of the primary and disposed on both the inner and outer periphery of the core, said conductors on the outer periphery being connected to both of said discs, while the conductors on the inner periphery extend a distance beyond the core at one side, one of said discs having an abutment, a ring surrounding the outer ends of said conductor extensions, and a pair of insulated electrodes clamped between said ring and the abutment, thereby forming terminals for the secondary of the transformer.

11. In a tube welding transformer, an annular core, a shaft concentric with and passing through the core, a primary winding surrounding and rotatable with the core, means for conveying current to said primary, a secondary winding; formed by two discs, one on each side of the core, and conductors alternately intermingled with the coils of the primary and disposed on both the inner and outer periphery of the core, said conductors on the outer periphery being connected to both of said discs, while the conductors on the inner periphery are connected to one of said discs and extend a distance beyond the core at the other side, the disc on the other side having an abutment, a ring surrounding and connecting the outer ends of circular said conductor extensions, a pair of circular insulated electrodes concentrically arranged with respect to the axis of the core and clamped between said ring and the abutment, thereby forming terminals for the secondary of the transformer, said abutment and ring being hollow, a tube for cooling fluid positioned within said shaft but spaced from its inner wall, means for passing the fluid to said hollow portions of the ring and abutment, and means for passing the fluid from said hollow parts to the space in the shaft around said tube.

12. A rotary transformer including an annular core, means for rotating the core, a primary winding composed of spaced coils looped around the core, a secondary; formed at least on the outer periphery of the core of bar conductors positioned between said primary coils and a pair of discs located, one each on opposite sides of the core, said bars on the outer periphery being anchored to said discs, a two-part electrode wheel concentric with the axis of the core and positioned adjacent one of said discs, means connected to the other of said discs and extending through the interior of the core for extending the secondary circuit from said disc to a distance beyond the opposite side of the core, an abutment for the other disc located adjacent said wheel, and a ring for clamping said electrode wheel between the abutment and ring and for carrying the secondary circuit from said extended means to one of the parts of the wheel.

13. A rotary transformer including an annular core and a shaft extending through and rotatably carrying the core, a tube of good conducting material carried outside but concentric with the shaft and extending through the core, a primary winding composed of spaced coils looped around the core, a secondary; formed of bar conductors positioned between said primary coils, a disc at each side of the core, said bars on the outer periphery of the core being anchored to both discs while the bars on the inner periphery of the core rest on said tube and are anchored to only one disc and extend a distance beyond the other side of the core; an abutment for the other disc, a ring electrically connected to said extended bar ends, a two-part electrode wheel having the parts separated by an insulator and clamped between said ring and abutment.

14. A heating and welding transformer including an annular core, a primary winding composed of coils looped around the core, a secondary composed of bar conductors intermingled with the primary coils on the inner and outer peripheries of the core, those bars on the inner periphery extending a considerable distance beyond the core on one side, a disc for joining the bars together on one side of the core, a disc located on the other side of the core, said latter disc being connected to the bars on the outer periphery of the core and having an abutment, a two-part electrode wheel having the parts separated by an insulator one part engaging said abutment, and means electrically engaging the extended bar ends and the other part of the electrode wheel for holding the wheel in operative position.

In testimony whereof, I affix my signature.

THOMAS M. HUNTER.